March 22, 1938. J. BLANCHET 2,111,549
VALVE FOR INTERNAL COMBUSTION ENGINES
Filed Dec. 31, 1935   2 Sheets-Sheet 1
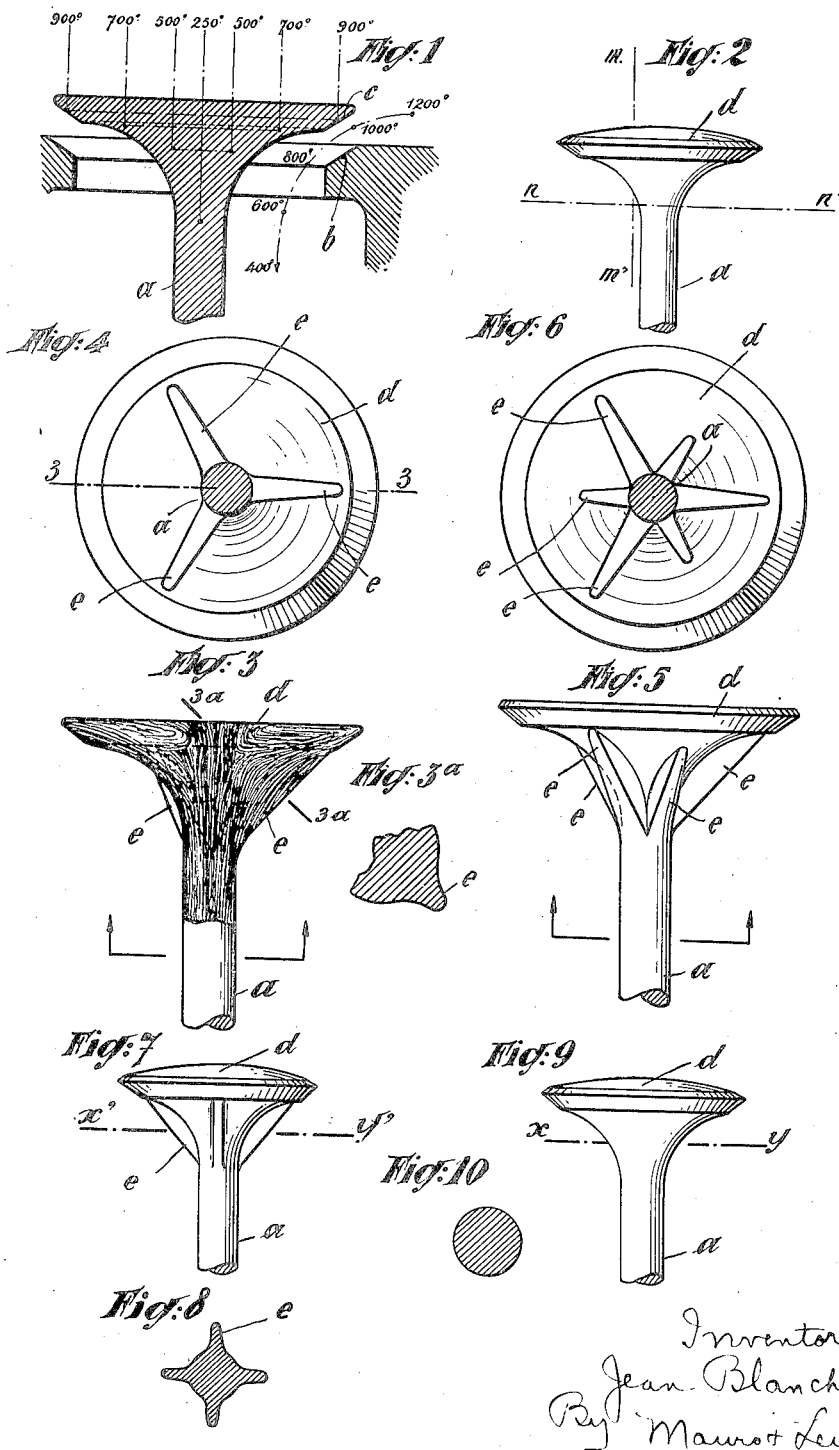

March 22, 1938. J. BLANCHET 2,111,549
VALVE FOR INTERNAL COMBUSTION ENGINES
Filed Dec. 31, 1935 2 Sheets-Sheet 2

Inventor:-
Jean Blanchet
By Mauro & Lewis,
Attorneys

Patented Mar. 22, 1938

2,111,549

UNITED STATES PATENT OFFICE 2,111,549

VALVE FOR INTERNAL COMBUSTION ENGINES

Jean Blanchet, Paris, France

Application December 31, 1935, Serial No. 56,984
In France January 4, 1935

2 Claims. (Cl. 123—188)

The present invention relates to valves for internal combustion engines. Its object is to provide a valve which improves the safety of working, the resistance and the efficiency of internal combustion engines provided with valves. The invention is more especially, although not exclusively, concerned with outlet valves for such engines of the type above referred to.

Most internal combustion engines, and especially modern engines, which are designed to work with a high efficiency, have various drawbacks inherent in the valves: On the one hand, the difficult flow of the gases, wire-drawn between the seat and the valve, causes imperfect fillings of the cylinders or counter-pressures in the exhaust. On the other hand, fluidtightness of the seats is rapidly destroyed, the metal is injured and the valve head breaks, the common cause of these drawbacks being the exaggerated and asymmetrical heating of the valve head.

As a matter of fact, it is found that, in exhaust valves, there is always a sector of the valve that is subjected to a more intensive action of the exhaust gases. The distribution of the temperatures is therefore not of revolution around the axis of said valve. Consequently, an asymmetrical expansion of this valve takes place, thus warping its head, so that the joint between the valve head and its seat is defective in the hot state while it is excellent in the cold state.

Furthermore, inlet valve can be cooled in three different manners, to wit: conduction through rod $a$ (Figs. 1 and 2), conduction through seat $b$, and convection through the fresh gases fed to the cylinder past said valve. But for the exhaust valve, there is no convection through fresh gases and as a consequence of the bad contact between the valve and its seat in the hot state, the cooling through the seat by conductivity is very much reduced. Cooling through the stem has a preponderating importance. It follows that portion $c$ of the valve (Fig. 1), which is the part of the piece which is farthest from the stem, is the hottest portion of the valve because it is in contact with the escaping exhaust gases, which are still very hot. Accordingly, the essential part of the valve, that calling for the greater hardness, is the part exposed to the highest temperature of working.

It often occurs that too considerable a dissymmetry of the heating produces excessive tensions in the metal which, in addition to those resulting from the very high accelerations of the movement, cause the head $d$ of the valve to break. Breaking generally takes place where the head $d$ is connected to the stem $a$ (either along line $mm'$ or along line $nn'$, Fig. 2), which seems to indicate a certain weakness of this portion of the valve.

There exist already valves, described in prior patents, provided with small blades, intended merely to produce a rotation of the valve in order to obtain an automatic grinding of the seats. These blades have a relatively high angle inclination with respect to the axis of the valve (at least 30°) and, on the other hand, rotation is facilitated by mounting the tail of the valve in a ball bearing.

Experience taught that the angles of attack due to the high angle inclination of the blades produce too quick a rotation of the valve, which involves very serious drawbacks; in particular, the very rapid wear and tear of the seat involves serious disturbances in the valve timing. If it is endeavoured to obviate these drawbacks by reducing the active surface of the blades, rotation no longer takes place for low or average speeds of revolution of the engine. On the other hand, blades having a high angle inclination with respect to the axis of the valve brake the flow of the gases and therefore reduce the efficiency of the engine. Finally, the considerable obliquity of the blades produces, in consequence of their expansion when heated, distortions of the piece which nearly wholly destroy fluidtightness and quickly produce breaking of the valve head.

According to the essential feature of the present invention, the valve, which is made of a single part includes a head having an annular seat formed on the periphery and carried by a stem integral therewith, with a relatively small number of ribs extending from said head and joined to said stem, the fibers of the metal of said ribs being continuous and following the outline of said ribs, the latter having a low angle inclination with respect to the corresponding radial planes of the valve and forming between them recessed passages of continuous curvature formed in the under face of said head, the section of the part of the valve that extends between the lower edge of the seat and the stem being a curve which is located wholly below the plane of said under edge of the seat.

Other features of the present invention will result from the following detailed description of some specific embodiments thereof.

Preferred embodiments of the present invention will be hereinafter described, with reference to the appended drawings, given merely by way of example, and in which:

Figs. 1 and 2 are an axial section and an elevational view, respectively, of an ordinary valve, illustrated in order to facilitate explanations;

Fig. 3 is an axial sectional view of a valve made according to the present invention;

Fig. 3a is a section on the line 3a—3a of Fig. 3;

Fig. 4 is a corresponding bottom view;

Fig. 5 is an elevational view of a modification;

Fig. 6 is a bottom view corresponding to Fig. 5;

Fig. 7 is an elevational view of another embodiment of the invention;

Fig. 8 is a sectional view on the line x'—y' of Fig. 7;

Figs. 9 and 10 are views analogous to Figs. 7 and 8, respectively, made for comparison purposes, Fig. 10 being a sectional view on the line x—y of Fig. 9;

Figure 11:
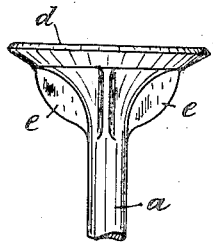
Figs. 11, 12 and 13 are elevational views of three modifications of the invention.

In the embodiment of Figs. 3 and 4, the portion of the valve that connects the stem with the head, instead of being of the usual shape of a body of revolution, is provided with ribs $e$ the ridges of which are disposed along the generatrices of a cone or the generatrices of a hyperboloid of revolution, making with the axis of revolution an acute angle of a value ranging preferably from 0 to 15°, the width of said ribs increasing from the stem toward the head. The directrix or meridian line of the surface of revolution which constitutes the intervals between the ribs is highly curved so as to lighten the weight of the valve as much as possible.

Ribs $e$, the number of which may be odd or even, may be all of the same shape (Figs. 3 and 4), or some of them may be of a shape different from that of the others (Figs. 5 and 6), provided that the whole of the piece has the axis of the valve as chief axis of inertia. The ridge of each rib directly joins the seat surface $c$ of the valve with its stem $a$ along a line which may be a straight line, a plane curve or a twisted curve.

Each rib therefore starts as close as possible from the seat surface of the valve, which it connects directly with the rod at a point thereof which is as far as possible from the head. The cross section of each rib through a plane at right angles thereto widens gradually from the ridge toward the base, as shown by Fig. 3a. The shape at the bottom of the intervals between the ribs is such that the area of the section S' of a ribbed valve according to the invention by a plane $x'$—$y'$ at right angles to its axis (Figs. 7 and 8) is equivalent to the area of the section S of a valve of corresponding size of the usual shape (Figs. 9 and 10), so as to obtain, according to the present invention, a valve of a weight equivalent to that of valves of the same size employed up to this time. Preferably, the ribs are integral with the mass of the valve.

According to a very important feature of the present invention, the ribs are obtained directly by die-forging of the valve head by means of a die of suitable shape. Accordingly, as shown by Fig. 3, I obtain a valve in which the fibers of metal are not broken or twisted but follow the outline of the piece. This internal structure of the metal is very important for practical purposes, as well from the point of view of mechanical strength as from that of satisfactory cooling.

The advantages obtained with the structure according to the present invention are the following:

1.—Each rib constitutes a stiffening element which supports the corresponding portion of the seat surface. For an equal weight, a ribbed valve is stronger than an ordinary valve; for an equal resistance, it is of lighter weight.

2.—Each rib constitutes means for directly evacuating the calories from the head, which is very hot, toward the stem, which is cooler, without passing through the central part of the piece, so that the valve is better cooled.

3.—The flow of the gases is controlled by the ribs, between which said gases have a section of flow which is not so flat and narrow as in ordinary valves. The wiredrawing effect resulting from the passage of the gases between the valve head and its seat is therefore reduced. There results a certain reduction of the exhaust counter-pressure.

4.—The ribbed part of the valve, when the ribs are slightly inclined with respect to the axis of the valve, acts as a small action turbine under the effect of the gaseous stream and produces a very slow rotation of the valve every time it is lifted from its seat, and therefore a uniform distribution of the temperatures (the isothermal surfaces in the piece are surfaces of revolution about the axis of the piece), which distribution prevents warping of the head, ensures the proper cooling of said heat by the seat of the valve, maintains the initial fluidtightness and therefore prevents injury of the parts while ensuring the best possible efficiency of the engine.

It should be noted that the elements of the surface of the valve lying between the ribs, instead of being in the form of bodies of revolution, might have any shape whatever, provided they are properly jointed to the adjacent ribs.

Figure 12:
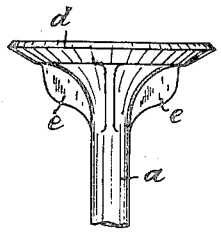
Figure 13:
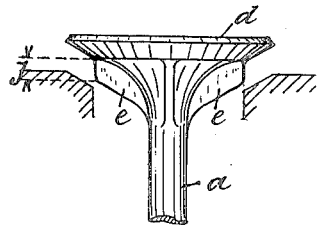

In Figs. 11 to 13, I have shown different shapes of ribs in which said ribs have their convexity turned outwardly. Ribs of this shape have a very large surface, which ensures a good radiation of heat, and, furthermore, they form a particularly good mechanical connection between the head and the stem. Instead of gradual curved lines, the ridges of the ribs might also have the shape of complex lines, including portions of straight lines and curved lines.

The ribs may be joined to the head and to the stem at any desired angle and they may be inclined in either direction with respect to the axis of the valve.

The form shown in Fig. 13 is particularly interesting. In this embodiment, the portion of the rib that is close to the head is rectilinear and the height $j$ of this portion is, for instance, substantially equal to the lifting displacement of the valve. With this arrangement, the ribs ensure a better guiding of the gases by forming partitions between the passages for said gases and compelling said gases to sweep their whole area.

In a general way, while I have, in the above description, disclosed what I deem to be practical and efficient embodiments of the present invention, it should be well understood that I do not wish to be limited thereto, as there might be changes made in the arrangement, disposition and form of the parts as comprehended within the scope of the accompanying claims.

What I claim is:

1. A valve for an internal combustion engine, made of a single part, which comprises, a head having an annular seat formed on its periphery, a stem integral with said head, and a relatively small number of ribs extending from said seat and joined to said stem, the fibers of the metal of said ribs being continuous and following the outline of said ribs, said ribs having low angle inclination with respect to corresponding radial planes of the valve, and having between them recessed passages of continuous curvature formed in the under face of said head, the section of the part of the valve extending between the lower edge of the seat and the stem being a curve which is located wholly below the plane of said under edge of the seat.

2. A valve for an internal combustion engine, made of a single part, which comprises, a head having an annular seat formed on the periphery thereof, a stem integral with said head, and a relatively small number of die-forged ribs extending from said seat and joined to said stem, and integral with both, said ribs having low angle inclination with respect to corresponding radial planes of the valve, and having between them recessed passages of continuous curvature formed in the under part of said head, the section of the part of said head which extends between the lower edge of the seat and the stem by any radial plane being a curve which is located wholly below the plane of said under edge of the seat.

JEAN BLANCHET.